United States Patent [19]

Oka et al.

[11] Patent Number: 5,247,965
[45] Date of Patent: Sep. 28, 1993

[54] LINEAR SOLENOID VALVE APPARATUS

[75] Inventors: Takeya Oka, Nagoya; Masao Saito, Nishio; Nobuaki Miki, Kariya; Kazunori Ishikawa, Toyota; Kunihiro Iwatsuki; Hideaki Otsubo, both of Toyota; Yasuo Hojo, Nagoya; Hiromichi Kimura, Toyota, all of Japan

[73] Assignees: Aisin AW Co., Ltd.; Toyota Jidosha Kabushiki Kaisha, both of ; JPX

[21] Appl. No.: 786,817

[22] Filed: Nov. 5, 1991

[30] Foreign Application Priority Data

Nov. 5, 1990 [JP] Japan ................... 2-300355

[51] Int. Cl.⁵ .......................................... F15B 13/044
[52] U.S. Cl. ..................... 137/625.65; 137/546; 137/625.69
[58] Field of Search ............ 137/546, 625.65, 625.69

[56] References Cited

U.S. PATENT DOCUMENTS

| 4,250,922 | 2/1981 | Will et al. | 137/625.65 |
| 4,838,518 | 6/1989 | Kobayashi et al. | 137/625.65 X |
| 4,971,116 | 11/1990 | Suzuki et al. | 137/625.65 |
| 5,127,287 | 7/1992 | Taniguchi et al. | 251/127 X |

FOREIGN PATENT DOCUMENTS 2-31062  2/1990  Japan .

Primary Examiner—Gerald A. Michalsky
Attorney, Agent, or Firm—Lorusso & Loud

[57] ABSTRACT

A linear solenoid valve apparatus includes a linear solenoid housed within a valve body. The linear solenoid valve includes a sleeve with an open channel conduit on its exterior surface, an exhaust port in communication with the open channel in the lower portion of the sleeve, a feedback port, a spool and a spring. The valve body includes a supply passage connecting with the open channel, off center at the top of the sleeve. The structure is designed to prevent the valve from sticking.

4 Claims, 2 Drawing Sheets

LINEAR SOLENOID VALVE APPARATUS

BACKGROUND OF THE INVENTION

1. Field of the Invention

This invention relates to a linear solenoid valve apparatus having a linear solenoid valve for varying a fluid pressure corresponding to an electric signal, such as an electric current, and a valve body equipped with the linear solenoid valve. In particular, it relates to equipment for preventing a linear solenoid valve from sticking due to the presence of foreign substances at the sliding surfaces thereof.

2. Description of the Prior Art

A linear solenoid valve includes a modulator valve having a valve sleeve unit and an electromagnetic valve having a plunger and an electromagnet with a core and a coil assembly. The modulator valve includes a supply port and an output port, a spool, a spring biasing the spool, and an oil channel supplying a feedback pressure, wherein the spool is moved to a given position by balancing the force corresponding to the electric current in the electromagnet, the spring biasing force on the spool, and feedback pressure supplied to a feedback pressure chamber, to supply a regulated oil pressure from the output port.

When the linear solenoid valve is used as a hydraulic control device of a vehicle, as shown in FIG. 6, it is provided in a hole 42 in a lower portion B of a valve body.

Conventionally, a supply port 15 is formed in the upper side of valve sleeve 5 and an open portion 15c of the port is disposed to communicate with an oil supply hole 43 formed in the lower portion of the valve body "B". In the case where foreign matter is mixed in the oil, such as steel powder, in the above described linear solenoid valve apparatus, the foreign matter is apt to be introduced (1) directly to the spool 6 through an oil supply hole 42 and a supply port while supplying oil and (2) through a supply hole 43 and a supply port 15, opening upwardly, by settlement when the vehicle is stopped. Thus, there exists the danger that foreign matter will cause valve sticking by deposition on the spool 6 in the supply port 15.

When a linear solenoid valve apparatus is used for line pressure control in the hydraulic fluid control device of an automatic transmission, the linear solenoid valve apparatus operates continuously during vehicle driving. Therefore, foreign matter introduction is common. Once valve sticking has occurred, it is impossible to operate an automatic transmission smoothly.

SUMMARY OF THE INVENTION

The object of the invention is to provide a structure in which foreign matter can't be inserted at the surfaces between the valve sleeve and the valve spool, the valve sticking is prevented and the reliability of the linear solenoid valve apparatus is improved as the result.

For attaining the above objective, the linear solenoid valve apparatus of the invention includes a linear solenoid valve having a sleeve with a supply port, an output port, an exhaust port, and a feedback pressure chamber. A spool is slidably mounted in the sleeve, for regulating an oil supply pressure to a pressure corresponding to an input signal to an electromagnet, by balancing the loading of the electromagnetic valve, the spring force, and the output feedback loading. The valve body which houses the valve sleeve of the linear solenoid valve includes a supply passage in communication with the upper hole in the valve sleeve. The valve sleeve has an open channel conduit in the outer circumferential surface thereof, which is connected to the supply port at one end. The valve sleeve of the solenoid valve is mounted in the valve body in a manner to connect the open channel conduit to the supply port, with the supply port facing to the lower portion, and the connecting portion between the open channel conduit and the supply port is disposed in the lower portion relative to a horizontal center line. According to the above structure, oil supplied from the supply passage is led to the lower portion of the valve sleeve along the open channel conduit and led to the spool portion of the solenoid valve from the supply port opening to the lower portion. Then, foreign matter such as steel powder sinks to the lower portion because of the its weight; which overcomes the suction flow force, since the connecting portion between the open channel conduit and the supply port is located at the lower portion. Accordingly, foreign matter can't be introduced to the spool. That is, the spool will move smoothly in accordance with the electric signal to the electromagnet to supply a fluid pressure from the output port corresponding to the electric signal.

These and other objects and advantages of the present invention will become clear from the following description with reference to the accompanying drawings.

DESCRIPTION OF PREFERRED EMBODIMENT

Figure 5:
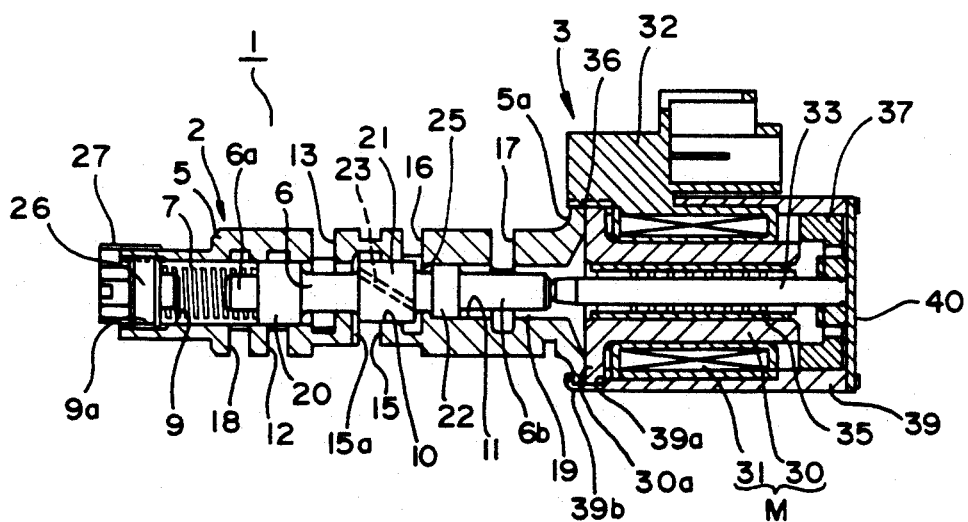
FIG. 5 is a cross-sectional view of a linear solenoid valve of the present invention.
Figure 2:
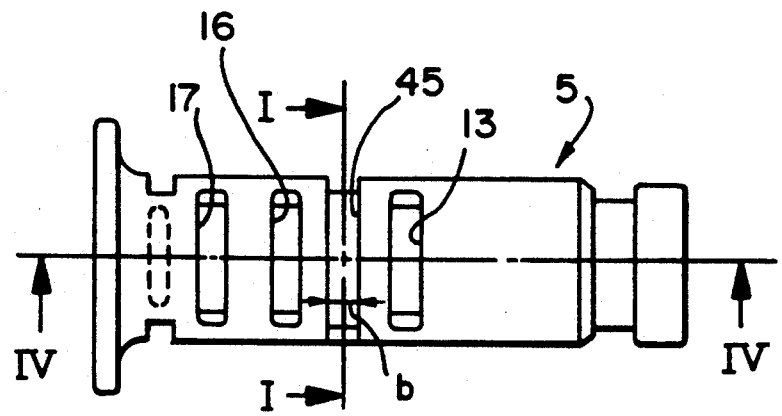
FIG. 2 is a plan view of a valve sleeve of the present invention.
Figure 3:
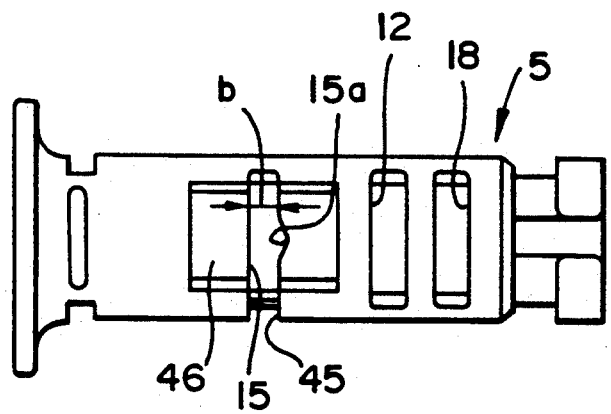
FIG. 3 is a bottom view of the valve sleeve of FIG. 2.
Figure 4:
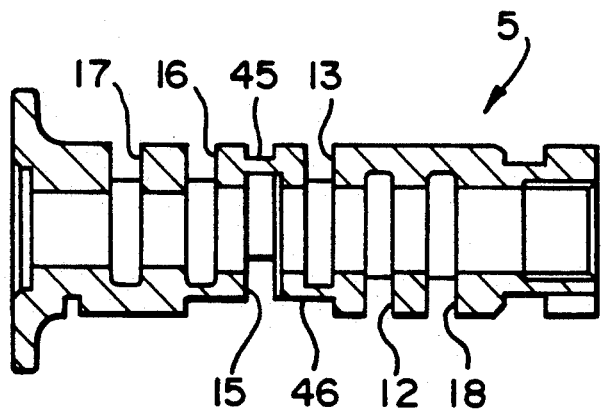
FIG. 4 is a cross-sectional view taken along IV—IV line of FIG. 2.

The linear solenoid valve apparatus 1, as shown in FIG. 5, includes a modulator valve 2 and an electromagnetic valve 3. The modulator valve 2 has a valve sleeve 5 and a valve spool 6. The valve sleeve 5 has a hole 9 in which is axially disposed a spring 7, a large size guide hole 10 in which the valve spool 6 is disposed slidably therein, and a small size guide hole 11. The outer circumference of the valve sleeve 5 has, in communication with the guide hole 10, an exhaust port 12, an output port 13, and a supply port 15. Circumferentially extending grooves or conduits are formed in communication with each of these ports.

The supply port 15 has a notch 15a for damping oil pressure vibrations and for smoothing supply pressure to a fixed output pressure by restricting fluid pressure through the spool as described below.

A feedback chamber 16 is defined between spool lands and is closed so as not to be connected to any passage. An open passage 17 relieves oil fluid pressure from chamber 19. An open passage 18 extends radially from the hole 9 in which the spring 7 is disposed. Spool 6 has two lands 20 and 21 disposed slidably in the large size guide hole 10 and a land 22 disposed slidably in the small size guide hole 11. The large size land 21 has an oil hole 23 for feedback pressure and the large size land 20 restricts communication between output port 13 and exhaust port 12 to prevent the output fluid pressure from becoming higher than a fixed value. The large size land 21 restricts communication between supply port 15 and output port 13 to modulate output oil pressure in accordance with the location of spool 6. The relationship between each port and each land is a so-called overlapped type structure. Ordinarily, supply port 15 is connected to output port 13 by a restricted oil pressure. A feedback chamber 25 is disposed between the large size land 21 and a small size land 22, and is supplied output fluid pressure through feedback oil pressure hole 23 to provide a feedback pressure acting against the force of spring 7. Furthermore, spool 6 has a projection 6a at one end thereof for receiving spring 7 and a leg 6b at the other end thereof.

The valve sleeve 5 has a threaded hole 9a extending axially from hole 9, in which an adjusting bolt 26 is threadably mounted. A coil spring 7 is provided between the adjusting bolt 26 and the projection 6a. The spring force is adjusted by rotation of the bolt 26. Furthermore, the valve sleeve has an engaging means 27 adjacent the bolt 26 to fix bolt 26 against rotation. The valve sleeve 5 has a radially extending flange 5a at the front end thereof, through which modulator valve 2 is fixed to the electromagnetic operator 3. Electromagnet 3 has a cylindrical core 30 and electromagnetic coil assembly 31 disposed around the core 30 which form an electromagnet M when supplied a fixed electric current through a connector 32. Furthermore, core 30 has a flange 30a at the end adjacent the modulator valve 2. A push rod 33 is supported slidably in the center hole of the core 30 through a linear type rolling bearing. One end of the push rod 33 contacts spool 6 of the modulator valve and is supported by a spring 36 disposed between flanges 5a and 30a. The other end of the push rod 33 has a plunger 37 fixed thereto, which can be moved in the axial direction by the electromagnet M.

A cylindrical case 39 is fixed to the electromagnetic coil assembly 31 at the outer circumference thereof. A cap 40 is fixed to the case 39 at the front end thereof and the electromagnet operator 3 is covered tightly by the case 39 and cap 40. Case 39 has a shoulder portion 39a and a flange-receiving recessed portion 39b at the end adjacent modulator valve 2. Modulator valve 2 is connected and fixed to the electromagnetic operator 3 by pinching together flanges 30a and 5a by fitting flanges 30a and 5a into recess 39b.

Figure 1:
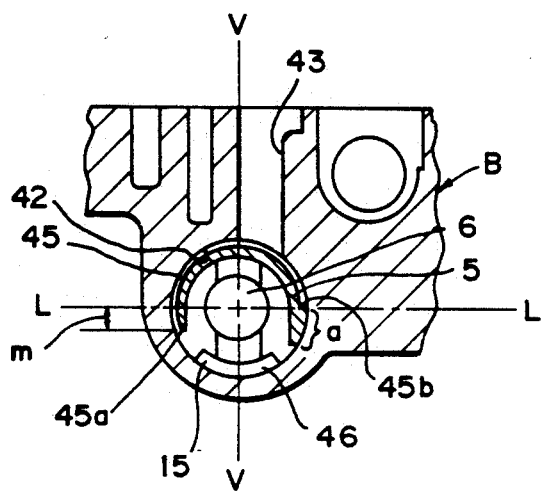
FIG. 1 is a partial, cross-sectional view of the main structure of a linear solenoid valve apparatus of the present invention, with the cross-section being taken along I—I line of FIG. 2.
Figure 6:
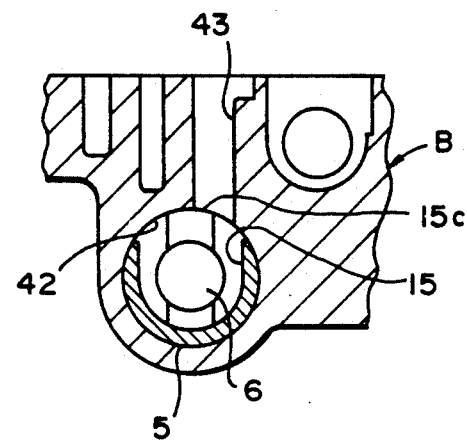
FIG. 6 is partial, cross-sectional view of a prior art linear solenoid valve mounted in a hydraulic valve body.

The valve sleeve 5, as shown in FIG. 1-FIG. 4, has an output port, a notch 16 for a feedback pressure channel 25, and an open port 17 for chamber 19 (See FIG. 2) at its upper side and an open port 18 for spring hole 9, an exhaust port 12, and a supply port 15 at its lower side. See FIG. 3. Furthermore, valve sleeve 5 has open channel conduit 45 extending partially around the outer circumference in communication with the supply port 15. The open channel conduit 45, as shown in FIG. 1, is connected to the supply port 15 at one end 45a, and blocks the supply port 15 near the other end 45b by a fixed length "a". Supply port 15 of axial length "b" extends 120° around the circumference of the sleeve 5 and the open channel conduit 45 has a width "b" equal to that of the port 15 and a depth fixed to supply fluid smoothly.

Valve spool 5 has a notch 46 extending 60° around its circumference, which is in communication with port 15. The notch 46 forms a foreign matter collector under the conditions prevailing in the valve body.

The hydraulic fluid control device as shown in FIG. 1 has a valve body lower portion "B". The lower portion B is connected to the upper portion (not shown in figure) to define a valve body for containing a plurality of valve spools. The valve body is fixed below the transaxle case in a horizontal position and covered by the oil pan under it. The valve body lower portion B has a hole 42 disposed horizontally for mounting a linear solenoid valve 1 in the valve body and a supply passage 43 in communication with the hole 42. The valve spool 5 of the modulator valve 2 is arranged in the hole 42 for connecting the supply passage 43 to the open channel conduit 45 and to open the supply port 43 to the lower portion. The open channel conduit 45 provides a passage to the hole 42 of the valve body lower portion B. The end 45a of open channel 145 opens to the supply port 15 below line L—L which is the center line of the spool 6. The distance between the horizontal line and the location of the end 45a is determined so that supply pressure does not flow directly from the end 45a to spool 6, but to the spool 6 as a rising stream along the inner circumference of the hole 42 when the supply pressure is directed to the supply port through the open channel conduit 42.

The supply passage 43 formed in the valve body lower portion B is located on the side of the other end 45b of the open channel conduit 45 with respect to the perpendicular line V—V which is the center line of the spool 6. Because the open channel conduit 45 connects to the supply passage 43 on the other side of the top of the valve spool 5, foreign matter such as steel powder settling in the supply passage 43 collects in the open channel conduit 45 at the closed end 45b. The dead space "a" between the end 45b and the supply port 15 has a length determined to prevent foreign matter from discharging when supplying high hydraulic fluid pressure to the supply port 15, for example with the closed end 45b located at the horizontal center line L—L. The notch 46 in the supply port 15 also forms a foreign matter collector which collects foreign matter which flows in through the open channel conduit 45.

The operation of the linear solenoid valve apparatus of this embodiment will be described for the case of controlling line pressure in a hydraulic control device of an automatic transmission as follows. When supplying supply pressure from an oil pump to supply port 15, a fixed electric current is supplied to an electromagnetic coil assembly 31. Then, a load "F", which is received at the left end of spool 6 through push rod 33 by operation of a plunger 37, is provided by the engaged electromagnet "M". Under this condition, a biasing force to the right "Fsp" of spring 7 is applied to spool 6, and feedback oil pressure from feedback chamber 25, i.e. output pressure "P" (P (A1-A2)) differential between that on large size land 21 (area A1) and that on small size land 22 (area A2), pushes spool 6 to the left. The force "F" of plunger 37 is now balanced with the oil pressure P (A1-A2).

That is, $$F = Fsp - (A1 - A2)P$$

Accordingly $$P = (F_{sp} - F)/(A1 - A2)$$

Supply pressure from a supply port 15 is regulated so as not to be low when force "F" of plunger 37 is large and is supplied from an output port 13 to a modulating port (not shown in figure) of a primary regulator valve. When the supplied electric current is proportional to an output pressure so that an output pressure "P" becomes smaller, as the supplied electric current becomes larger, because plunger force "F" becomes higher as electric current supplied to electromagnet 3 becomes larger, linear solenoid valve 1 supplies a higher output pressure, as the supplied electric current becomes lower (high → low).

When oil is supplied from the supply passage 43 to the supply port 15, the oil is directed to the oil passage having the open conduit 45 through the hole 42, and to the spool 6 by ascending flow in the supply port 15 via opening 45a in the open channel conduit 45. Accordingly, the oil is supplied to output port 13 via a restricted area delimited by the land 21 as an output pressure. When the foreign matter such as steel powder is mixed in the oil, the foreign matter enters the supply port 15 along the inner circumference of the hole 42 from the top end 45a of the open channel conduit 45 along with the oil. However, the weight of foreign matter is so high that it settles to the collector area of the notch 46 instead of rising upward along the sleeve against gravity. Since the foreign matter collector 46 is large and extends in the axial direction, the foreign matter of high density is collected at the bottom of the collector 46.

When the vehicle is halted and the oil flow ceases, the foreign matter such as steel powder in the mixed oil sinks by gravity. If the foreign matter is located in the supply passage 43, it arrives at the open channel conduit 45 by settling. However, since the passage 43 is near to the closed end 45b, the foreign matter is collected in end 45b. Though the foreign matter is collected at the closed end 45b of open channel conduit 45 during a vehicle halt, it is kept at the closed end 45b against the oil flow if comparatively large and heavy foreign matter is introduced into conduit 45 during vehicle driving.

Though the above embodiment is a linear solenoid valve apparatus described as used for line pressure control, it goes without saying that the linear solenoid valve apparatus can also be used as a hydraulic control device for machines such as machine tools.

As shown in the above description, this invention improves the reliability of a linear solenoid valve by preventing the linear solenoid valve from sticking due to foreign matter introduced at the sliding surface of the spool. With the axially extending notch provided at the outer circumference of the valve sleeve, foreign matter sinking to the lower portion of the supply port is collected effectively in the notch and much of it is held there. Accordingly, the linear solenoid valve can be operated without any valve sticking for a long term when foreign matter is present.

We claim:

1. A linear solenoid valve apparatus comprising:
   a linear solenoid valve including:
   a sleeve having exterior and interior cylindrical surfaces and a hollow interior, an exhaust port radially extending through said sleeve for exhausting oil from said hollow interior, a supply port extending radially downward through said sleeve for supplying oil to said hollow interior and a circumferential groove cut into and extending partially around said exterior cylindrical surface, said circumferential groove having one end closed and a second end opening into said supply port at a point below a horizontal plane bisecting said sleeve; and
   a spool slidably mounted in said sleeve; and
   a valve body having:
   a hole in which said valve sleeve is mounted, and
   a supply passage opening to said circumferential groove at a point between said closed end and the highest point on said sleeve.

2. The linear solenoid apparatus of claim 1 wherein the sleeve also has a recess at the bottom of its exterior surface for collecting foreign matter introduced with oil passing through said supply passage, said recess extending partially around the circumference of said sleeve and having an axial dimension substantially larger than that of said supply port.

3. The linear solenoid apparatus of claim 1 wherein said supply port has a radially extending notch for damping oil pressure vibrations.

4. The linear solenoid apparatus of claim 1 further comprising a spring axially biasing said spool and an electromagnet for moving said spool against the biasing force of said spring.

* * * * *